April 22, 1969         A. SCHWARZKOPF         3,440,124
APPARATUS FOR MANUFACTURING GRIPHOLE CARRYING BAGS
Filed Aug. 13, 1965                    Sheet 2 of 4

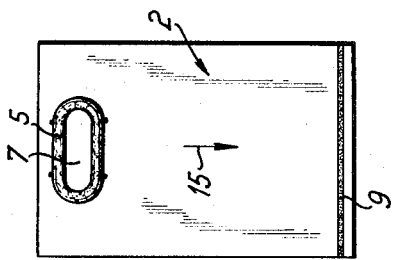
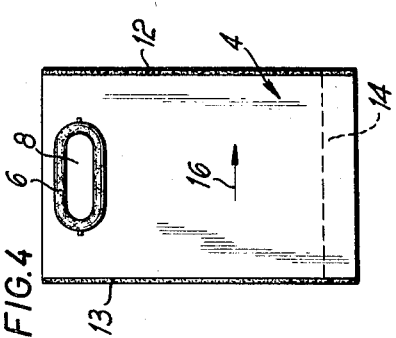
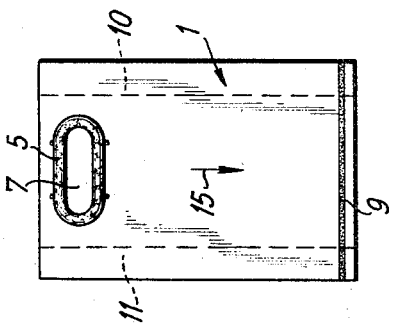
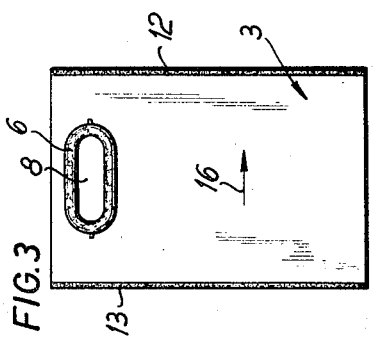
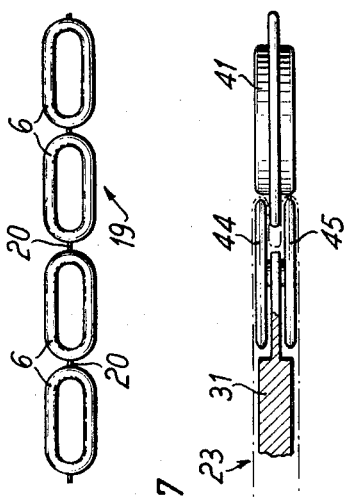
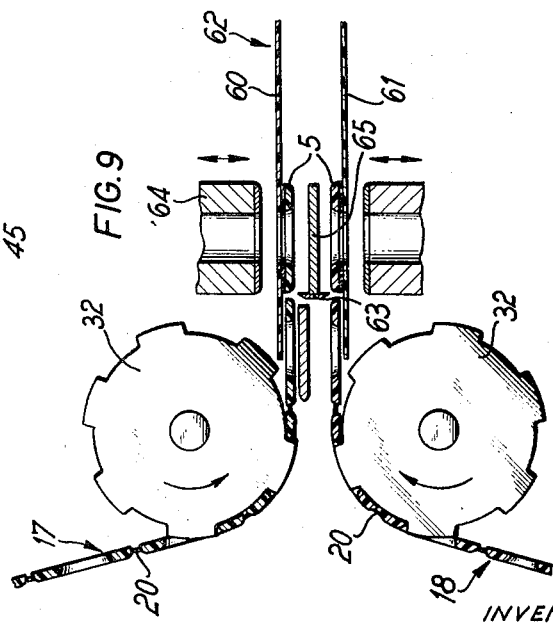

INVENTOR:
August SCHWARZKOPF

BY
Stevens, Davis, Miller & Mosher
ATTORNEYS

INVENTOR:
August SCHWARZKOPF

United States Patent Office 3,440,124
Patented Apr. 22, 1969

3,440,124
APPARATUS FOR MANUFACTURING GRIPHOLE
CARRYING BAGS
August Schwarzkopf, Lengerich, Germany, assignor to
Windmöller & Hölscher, Lengerich, Germany
Filed Aug. 13, 1965, Ser. No. 480,257
Claims priority, application Germany, Aug. 24, 1964,
W 37,432
Int. Cl. B32b 31/10, 31/18
U.S. Cl. 156—423          11 Claims

ABSTRACT OF THE DISCLOSURE

Apparatus for manufacturing a carrying bag from a two-ply heat sealable material, said apparatus comprising a conveying means for intermittently moving said material along a fixed path, means disposed adjacent said path for removing a portion of said web to form a griphole, means disposed in said path for separating said plies, means located above said path for feeding a plurality of reinforcing elements to the rims of said gripholes, means carried by one end of said separating means for heat sealing said reinforcing elements to said rims, means located in said path for applying a transverse seal to said bag and means for severing said finished bag.

---

This invention relates to a process of manufacturing griphole carrying bags from heat-sealable material, which bags comprise walls that are provided adjacent to the gripholes with reinforcing elements made from heat-sealable material, in which process, a web is intermittently advanced and gripholes are formed in the superimposed layers of the web during the standstill periods.

Griphole carrying bags have been known for a long time. Simple strips or sectional pieces have been used as reinforcing elements. The previous practice in the manufacture of such carrying bags comprises initially making the bag from a section of a web of heat-sealable material. Subsequently, either the reinforcing elements are heat-sealed first, which is followed by punching the gripholes, or, where sectional pieces are used as reinforcing elements, the gripholes are punched first and the sectional pieces are heat-sealed thereafter. Both manufacturing processes are complicated and time-consuming. Owing to the complication of the known processes, the manufacture of such carrying bags has not been fully mechanized so far because a suitable apparatus would be disproportionately expensive and yet could have only a small output. For this reason, manually operated devices, which are independent of each other, are used for carrying out the various steps of the known processes of making griphole carrying bags from heat-sealable material.

In view of this state of the art, it is an object of the invention to provide a process of manufacturing griphole carrying bags of the kind described initially hereinbefore, which process is unique in that it enables a fully automatic manufacture of the bags without manual operation. The various process steps must so match each other that the process can be carried out even on a machine which can be made in a simple manner and at low cost and which has an improved output compared to the prior art.

This object is accomplished according to the invention in a process of the type described initially hereinbefore in that the two plies of the web formed with the gripholes are kept spaced apart at least adjacent to the gripholes during the further advance of the plies, a reinforcing element is fed to the rim of the griphole in each ply, the reinforcing elements are simultaneously heat-sealed to the rims of the respective gripholes in both plies, thereafter at least one heat-sealed seam extending transversely to the longitudinal direction of the web is formed, and a section of the web corresponding to the finished bag is cut off also in a direction transverse to the longitudinal direction of the web.

In a preferred development of the invention, the reinforcing elements are in the form of coherent strips, which are intermittently fed to the rims of the gripholes in the respective plies of the web, and one reinforcing element for each ply of the web is served during each interval between two feeding steps.

The reinforcing elements for the rims of the gripholes may be fed to the outside or inside surfaces of the two plies of the web. In the case of tubular webs, the manufacture of griphole carrying bags having external reinforcing elements is preferable in carrying out the process according to the invention.

In a development of the invention relating to the manufacture of griphole carrying bags with preferably internal reinforcing elements, the reinforcing elements for the rims of the gripholes are fed transversely to the direction of movement of a web which is substantially double-folded. This development of the invention may be modified in that the reinforcing elements for the rims of the gripholes are fed to the inside surfaces of the two plies in the direction of movement of a substantially double-folded web, when the free edge preferably of the upper ply of the web has been relaxed by a deflection of the web into a second plane of conveyance, which is parallel to and preferably below the previous plane of conveyance, and this relaxed edge has been spaced from the other ply adjacent to the rims of the gripholes by a deflection out of the plane of conveyance.

The invention relates further to a strip of plastic material, preferably for use in a process of manufacturing griphole carrying bags from heat-sealable material, such as has been described hereinbefore. This strip is characterized according to the invention by consisting of a plurality of preformed elements, such as reinforcing elements, which are interconnected by at least one thin connecting web between adjacent elements so as to form a feeding strip, which is adapted to carry load. The use of the plastics material strip according to the invention is by no means restricted to the process according to the invention for the manufacture of griphole carrying bags. Plastics materials strips according to the invention and consisting of chains of elements may be used wherever individual elements such as handles, spouts, push-buttons or the like must be fed and must be further processed as individual elements. Within the process according to the invention, each element of the plastics material strip has suitably the form of a closed ring so that the element ensures the provision of a reinforcement around the entire rim of the griphole.

Finally, the invention is directed to apparatus for carrying out the process which has been described hereinbefore. This apparatus is characterized according to the invention in that an intermittently operating pair of withdrawing rolls for the web are provided at the end where the finished griphole carrying bag is discharged, and a burning or cutting device for forming the gripholes is arranged at the other end, the burning or cutting device is succeeded by a feeder for feeding the reinforcing elements for the rims of the gripholes and a spacer is provided adjacent to the conveyor and serves for spacing the two plies of the web apart, said spacer carries in its rear portion a heat-sealing plate, which conforms to the reinforcing elements, pressure jaws, which are movable toward and away from the heat-sealing plate, are disposed on opposite sides of the latter, each of said pressure jaws is provided with an element for transferring heat or heating current through the gripholes to the heat-sealing plate, and the pair of withdrawing rolls are succeeded by a transverse heat-sealing device and a severing device.

For the manufacture of griphole carrying bags having internal reinforcing elements, the apparatus which has been described is further developed according to the invention in that the burning or cutting device is succeeded by a deflecting device, which deflects the web into a plane of conveyance which is spaced from the previous plane of conveyance, said deflecting device lifts at least the edge of one ply adjacent to the gripholes from the other ply, and heat-sealing jaws, which are movable toward and from the two plies are provided on both sides of the free edges of said plies adjacent to the deflecting device.

In the apparatus for manufacturing griphole carrying bags having external reinforcing elements, the knives for severing the reinforcing elements from the plastics material strips are suitably connected to the pressure jaws. In an apparatus for manufacturing griphole carrying bags having internal reinforcing elements, the knife is, according to the invention, double-edged and secured to a backing plate, which is disposed between the heat-sealing jaws and the planes in which the two layers of plies of the web are moved.

Various embodiments of the invention will be described by way of example hereinafter with reference to the drawing, in which FIGS. 1 to 4 are elevations showing four different griphole carrying bags, FIG. 5 is a central longitudinal sectional view showing diagrammatically an apparatus for manufacturing griphole carrying bags having external reinforcing elements, FIG. 6 is a top plan view of FIG. 5, the apparatus parts above the web being omitted, FIG. 7 is a sectional view taken on line VII—VII of FIG. 6 and FIG. 8 is a top plan view showing a portion of a plastics material strip which provides reinforcing elements.

FIG. 9 is a transverse sectional view showing an apparatus for manufacturing griphole carrying bags having internal reinforcing elements, the section being taken adjacent to the heat-sealing jaws.

Figure 5:
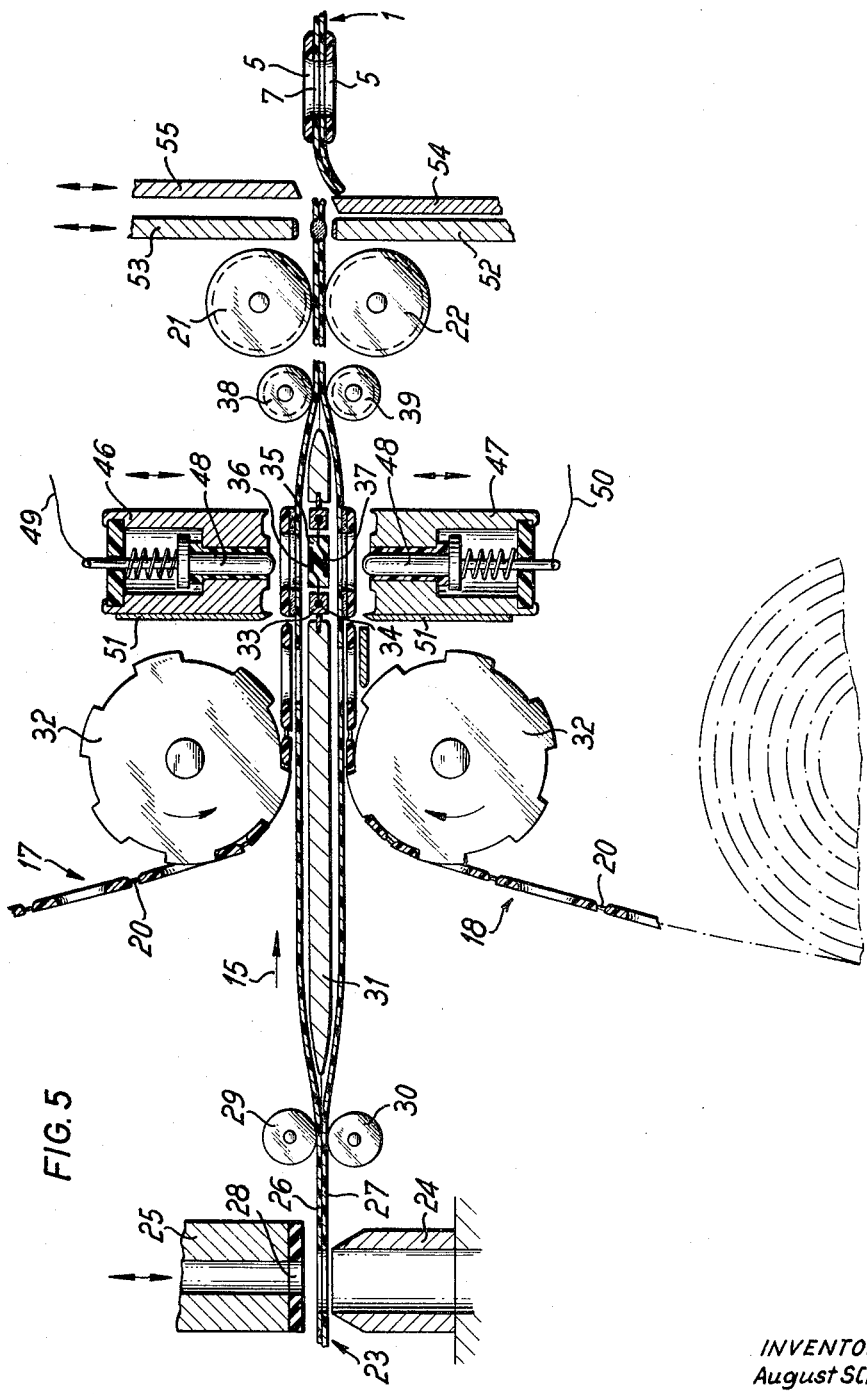

FIGS. 1 to 4 show four different griphole carrying bags 1, 2, 3, 4 having external reinforcing elements 5 and 6, which reinforce the rims of the gripholes 7 or 8 and constitute an improved grip for carrying the griphole carrying bags. The griphole carrying bags and the reinforcing elements consist of heat-sealable material. The thickness of the reinforcing elements is a multiple of the thickness of the material of the carrying bags.

The griphole carrying bag 1 shown in FIG. 1 has a bottom seam 9 and two side gussets 10, 11. This carrying bag is made from gusseted tubing.

The griphole carrying bag 2 shown in FIG. 2 has a bottom seam 9, like the griphole carrying bag 1, but no gussets. This carrying bag is made from plain tubing.

The griphole carrying bag 3 shown in FIG. 3 has two longitudinal side seams 12, 13. This carrying bag is made from plain tubing, which has been longitudinally slit on one side, or from a double-folded web.

The griphole carrying bag 4 (FIG. 4) corresponds substantially to the griphole carrying bag 3. It has two longitudinal side seams 12, 13, like the griphole carrying bag 3, and in addition a bottom gusset 14.

In the fully automatic manufacture of the griphole carrying bags 1 and 2 by the process according to the invention, the web is intermittently advanced in its longitudinal direction, indicated by the arrow 15. In the manufacture of the griphole carrying bags 3 and 4, the web is intermittently advanced in the direction of the arrow 16. Thus, the heat-sealed seams 9 and 12, 13 are transverse to the web.

In the manufacture of the griphole carrying bags 1 to 4 by the process according to the invention gripholes 7 and 8 are formed in the two superimposed plies of the web during the standstill of the web. During the further conveyance of the web, the two plies are spaced apart at least adjacent to the gripholes 7, 8. After at least one step, a reinforcing element 5 or 6 is fed to the rim of the griphole in each ply. Thereafter, the two reinforcing elements are simultaneously heat-sealed to the rims of the respective gripholes. After one or more further steps, a heat-sealed seam extending transversely to the longitudinal direction of the web is made in the manufacturing of carrying bags having a bottom seam, or two heat-sealed seams 12, 13 extending transversely to the longitudinal direction of the web are made in the manufacture of carrying bags having side seams, and a cut is effected also in a direction which is transverse to the longitudinal direction of the web.

In the manufacture of the griphole carrying bags 1 to 4, each of the reinforcing elements 5 and 6 is severed from the free end of special strips, which are intermittently advanced. This severing is effected when the web is at a standstill and the elements have reached the rims of the gripholes in the two plies of the web.

The plastic material strips for providing the reinforcing elements 5 of the griphole carrying bags 1 and 2 are shown at 17 and 18 in FIG. 5. A portion of a plastic material strip for providing reinforcing elements 6 for the griphole carrying bags 3 and 4 is shown at 19 in FIG. 8. The reinforcing elements 5 and 6 form closed rings. Each plastic material strip 17, 18 or 19 consists of a plurality of elements 5 or 6, which are connected to each adjacent element by two thin connecting webs 20 (FIG. 5) in the strips 17 and 18 and by one thin connecting web 20 (FIG. 8) in the strip 19.

The illustrated griphole carrying bags 1 to 4 have external reinforcing elements. The griphole carrying bags 3 and 4 having side seams may also be made with internal reinforcing elements, as will be described with reference to FIGS. 9 to 11.

Figure 6:
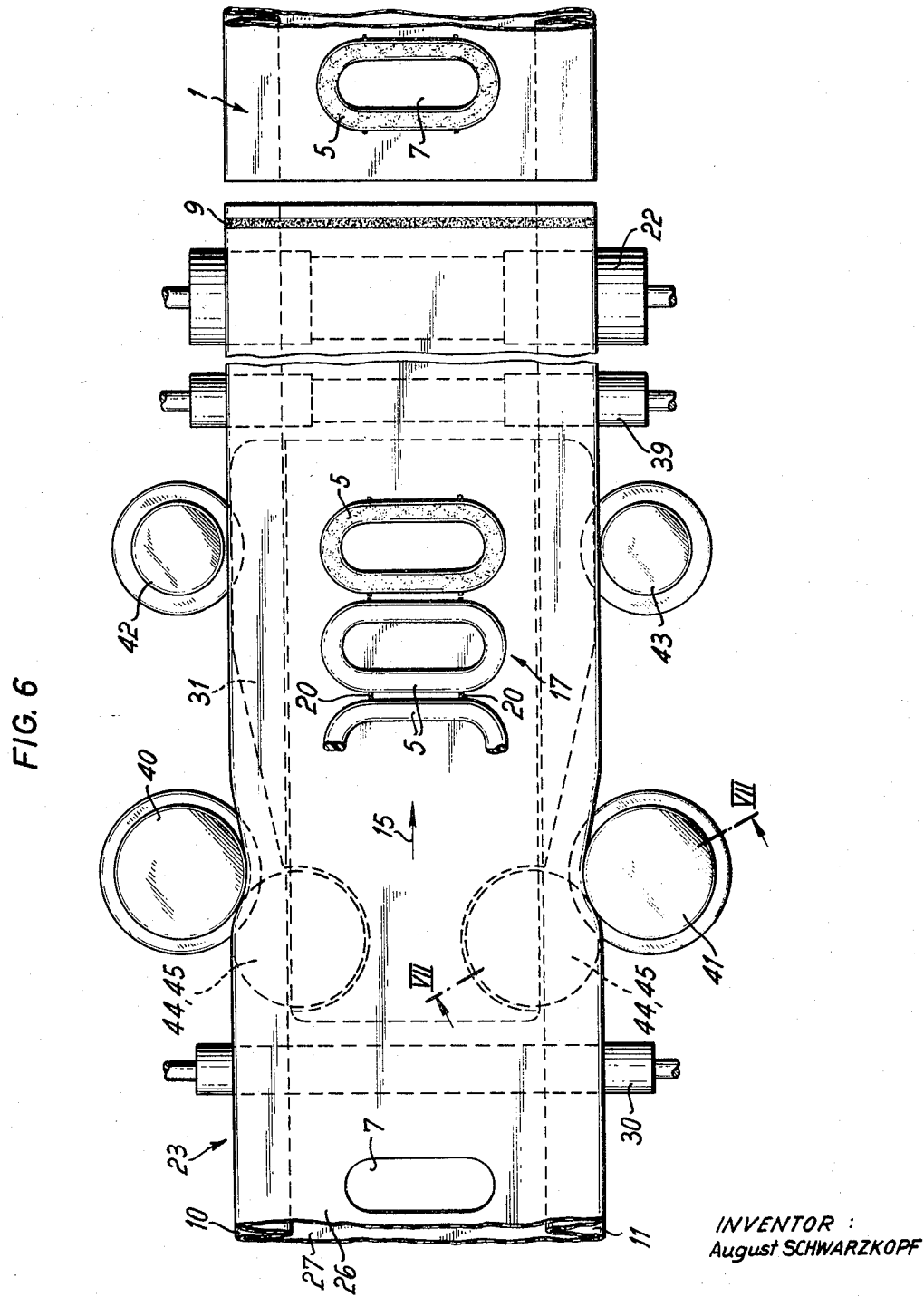

FIGS. 5 to 7 show an apparatus for the fully automatic manufacture of griphole carrying bags according to FIG. 1. An intermittently operating pair of withdrawing rolls 21, 22 serves for intermittently advancing the gusseted tubing 23 of plastic material in the direction of the arrow 15. (FIGS. 5 and 6.) A cutting device consisting of a profiled, stationary die 24 and a platen 25, which is movable towards and away from the die, serves for the simultaneous formation of the gripholes 7 in both layers 26 and 27 of the tubing 23. To ensure that the plastic material sheets punched out of the plies 26 and 27 are discharged through the die 24, compressed air is blown onto the die from a central air outlet opening 28 formed in the platen 25.

In the direction of movement of the web, the cutting device is succeeded by a pair of guide rolls 29, 30 and these are succeeded by a spacer 31, which is surrounded by the tubing 23 so that the two plies 26, 27 are spaced apart adjacent to the spacer. Two intermittently operated sprocket rollers 32 are mounted above and below the spacer 31, respectively, and serve for advancing the plastic material strips 17, 18 for providing the reinforcing elements. During the time in which the gusseted tubing 23 is advanced by the pair of withdrawing rolls 21, 22 for a distance which corresponds to the length of a carrying bag, the plastics material strips 17 and 18 are advanced for a distance which corresponds to one reinforcing element.

A recess of the spacer 31 accommodates a heat-sealing plate 33, in which an electric resistance wire 34 is embedded, each end of which is connected to a contact disc 36 or 37, which is mounted flush in an insulating member 35. In the direction of movement of the web, the spacer 31 is succeeded by a further pair of guide rolls 38, 39. FIGS. 6 and 7 indicate by way of example a suitable mounting for the spacer 31. The spacer is carried by two pairs of rollers 40, 41 and 42, 43. Two pairs of rollers 44, 45 bear on the rollers 40 and 41 and prevent a displacement of the spacer in the direction of movement of the gusseted tubing 23 (arrow 15). The rollers 40 to 43 have flanges, which engage the gussets 10, 11 of the tubing. The offset portions of the rollers provide for a lateral guidance of the spacer.

Two pressure jaws 46 and 47 are disposed opposite the two heat-sealing faces of the plate 33 and are movable toward and away from the heat-sealing plate. Each pressure jaw 46, 47 carries a contact pin 48, which extends through a griphole in the ply 26 or 27 of the tubing 23 and resiliently bears on the contact disc 36 or 37 in the operative position of the pressure jaw. The other end of each contact pin is connected to a current conductor 49 or 50. These conductors are included in a heating circuit. The heating current flows intermittently through the electric resistance wire 34. The sealing heat is transferred from the heat-sealing plate 33 through the web plies to the interfaces. Each pressure jaw carries on that side which faces the sprocket roller 32 a knife 51 for severing one reinforcing element 5 at a time from the plastic material strip 17 or 18.

In the direction of movement of the web, the pair of withdrawing rolls 21, 22 are succeeded by a heat-sealing device for forming the transverse heat-sealed seam which subsequently constitutes the bottom seam. This heat-sealing device consists of a stationary jaw 52 and a jaw 53, which is movable towards and away from this stationary jaw. The welding device may be of any suitable type and for this reason is not shown in more detail. Those portions of the heat-sealing tools which contact the gusseted tubing are provided with a release agent or consist of non-blocking material.

The last process step in the manufacture of the griphole carrying bags serves to sever a finished carrying bag from the web and is carried out by a stationary knife 54 and a knife 55 which is movable toward and away from this stationary knife.

The movements of the platen 25, the pressure jaws 46, 47, the heat-sealing jaw 53 and the knife 55 toward the web are effected at the same time. The advance of the gusseted tubing 23 and of the plastics material strips 17 and 18 are also effected at the same time when those parts which are displaceable at right angles to the plane of the web are in their inoperative position.

As is particularly well apparent from FIG. 6, the withdrawing rolls 21, 22 and the guide rolls 38, 39 are offset adjacent to the reinforcing elements 5 by the thickness of these elements so that a satisfactory advance of the web throughout the apparatus is ensured. FIGS. 5 and 6 show the arrangement in the condition immediately before the advance of the web is resumed.

The apparatus which has just been described serves for manufacturing the griphole carrying bag 1 and the griphole carrying bag 2. In the manufacture of the griphole carrying bag 2, the spacer 31 is replaced by a simpler spacer.

Basically, the apparatus shown in FIGS. 5 to 7 may also be used for manufacturing griphole carrying bags having side seams, as shown in FIGS. 3 and 4. In this case, the plastic material strips 17 and 18 are replaced by the plastic material strips 19 shown in FIG. 8 and consisting of a plurality of reinforcing elements 6, which are connected to each adjacent element by one thin connecting web 20. In the griphole carrying bags 1 and 2 the non-circular gripholes extend transversely to the direction of movement of the web, indicated by the arrow 15. In the griphole carrying bags 3 and 4, the gripholes extend in the direction of movement of the web (arrow 16). To form the heat-sealed seam 13, which is second in the direction of movement of the web, an additional heat-sealing device 52, 53 is required. The knives 54, 55 and the two pairs of heat-sealing jaws 52, 53, may be replaced by a known heat-sealing and severing device (hot-wire heat-sealing device) may be used.

Whereas griphole carrying bags having a bottom seam can be manufactured in a fully mechanized process only if they are provided with external reinforcing elements, griphole carrying bags having side seams may be made in a fully mechanized process whether they are provided with external or internal reinforcing elements because in these bags the two superimposed plies of the web are not connected at one edge of the web. In the manufacture of griphole carrying bags having internal reinforcing elements, the reinforcing elements for the rims of the gripholes are fed to the inside surfaces of the two plies of the web when these plies are spaced apart.

FIG. 9 shows a method of laterally feeding reinforcing elements 5 to the inside surfaces of plies 60, 61 of a double-folded web 62. In this case the web is intermittently advanced at right angles to the plane of the drawing. As in the device that has been described with reference to FIGS. 5 to 7, plastic material strips 17 and 18 are used, which are intermittently advanced by means of sprocket rollers 32 and one reinforcing element 5 is severed at a time from each of said strips. This severing is effected by means of a double-edge knife 63 during the operation of the two heat-sealing jaws 64, which are movable toward and away from the web. The knife 63 is secured to a backing plate 65, which is disposed between the heat-sealing jaws 64. If the handles are to be applied in this manner to the outside surfaces of the plies so that the handles extend transversely to the direction of movement of the web, a device as shown in FIGS. 5 and 6 may be employed in a suitable orientation.

Figure 10:
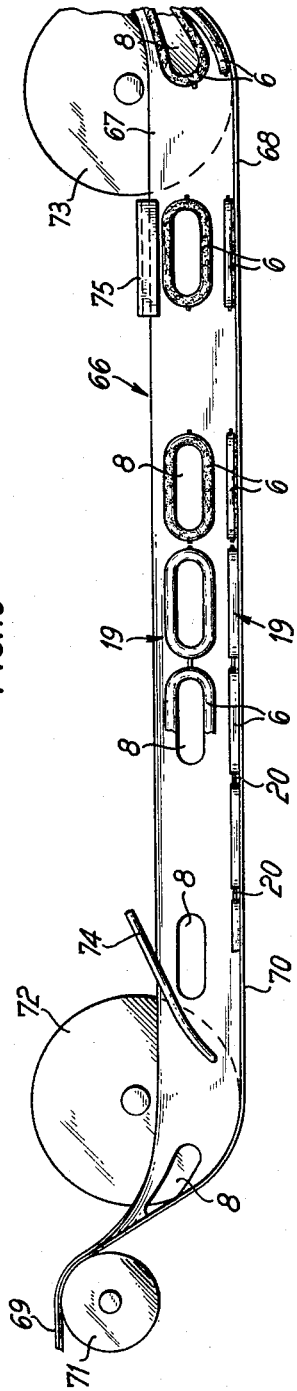
FIG. 10 is a side elevation showing a portion of the web adjacent to a deflecting device for spacing the free edges of the two plies.
Figure 11:
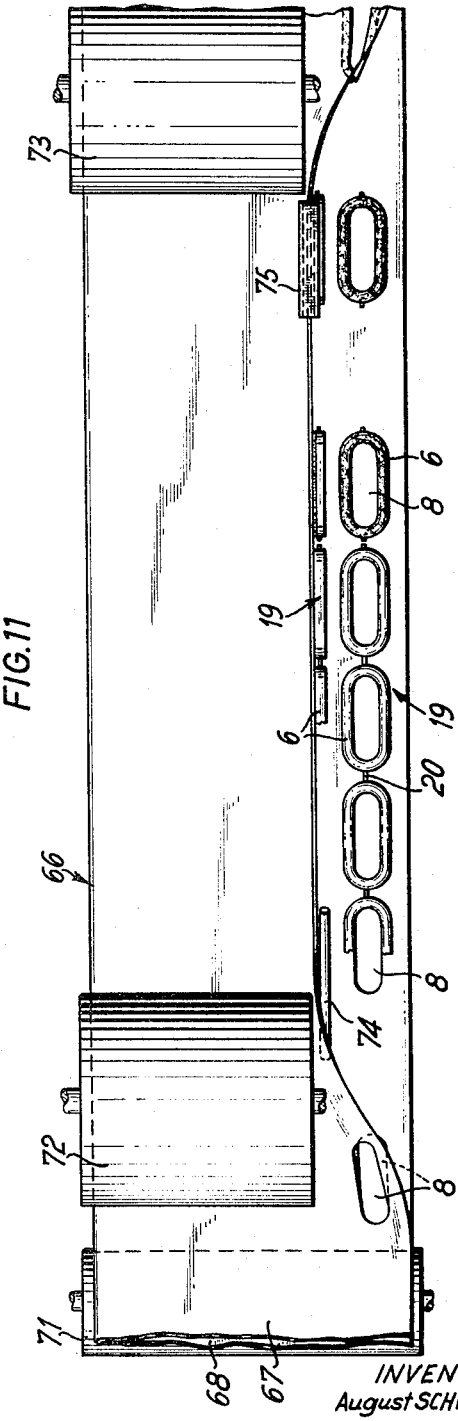
FIG. 11 is a top plane view showing the web portion of FIG. 10.

In the embodiment just described, the reinforcing elements 5 are laterally fed transversely to the direction of movement of the web 62. FIGS. 10 and 11 show how the reinforcing element may be fed in the manufacture of griphole carrying bags having internal reinforcing elements which extend in the direction of movement of the web. In this embodiment, plastic material strips 19 as shown in FIG. 8 are employed. The carrying bags are made from a double-folded web 66 comprising a top ply 67 and a bottom ply 68. To introduce the reinforcing elements 6 for the rims of the griphole between the two plies, a device is provided which deflects the web from a first plane of conveyance 69 (FIG. 10) into a second plane of conveyance 70, which is parallel to the former, and from the plane 70 back into the first plane of conveyance, and which holds the relaxed free edge of the ply 67 of the web 66 out of the plane of conveyance 70. The web is deflected by rollers 71, 72, 73 and a further roller, which is not shown owing to the lack of space and corresponds to the roller 71. A guide rod 74 is provided for deflecting the free edge of the ply 67. A guide bar 75 is provided close to the roller 73 and serves for holding the free edge of the ply 67. Heat-sealing and pressure jaws, not shown, are provided between the guide elements 74, 75 and serve for heat-sealing the reinforcing elements 6 to the inside surfaces of the plies 67 and 68. The knives for severing the elements 6 from the plastic material strips 19 are secured to the pressure jaws. To indicate that the reinforcing elements have been heat-sealed, the same are hatched in FIGS. 10 and 11 and in FIGS. 1 to 5. In FIGS. 10 and 11, the gripholes have the reference numeral 8 like the gripholes in the carrying bags in FIGS. 3 and 4.

During the movement of the web from the plane of conveyance 70 into the plane of conveyance 69, the raised free edge of the ply 67 is returned to a flat position. The carrying bag is then finished by transversely heat-sealing the web 66 and severing a corresponding portion of the web.

Instead of reinforcing elements combined in plastic material strips 17 to 19, reinforcing elements which are stacked in magazines may be fed to the process directly from the magazines. An apparatus for manufacturing griphole carrying bags having external reinforcements requires two magazines, each of which receives one stack of reinforcing elements. A pusher is associated with each magazine and serves for feeding one reinforcing element at a time from the magazine to the web. In an apparatus for manufacturing carrying bags having internal reinforcing elements, one magazine for receiving the reinforcing elements is sufficient if there is one pusher which feeds two reinforcing elements at the same time from the magazine between the two plies of the web. In this case, the reinforcing elements may be connected in pairs like a snap fastener, which may be used to close the finished carrying bag.

What is claimed is:

1. Apparatus for manufacturing a carrying bag from a two-ply heat sealable material, said apparatus comprising a conveying means for intermittently moving said material along a fixed path, means disposed adjacent said path for removing a portion of said web to form a griphole, means disposed in said path for separating said plies, means located above said path for feeding a plurality of reinforcing elements to the rims of said gripholes, means carried by one end of said separating means for heat sealing said reinforcing elements to said rims, means located in said path for applying a transverse seal to said bag and means for severing said finished bag.

2. The apparatus of claim 1 wherein said means for heat sealing said reinforcing elements to said rims comprises a heat sealing plate disposed between said two separated plies, a pair of pressure jaws adapted to urge said reinforcing elements on to said plies over said plate, and means to transfer heat through said jaws and said plies to said plate.

3. Apparatus according to claim 2 wherein said reinforcing elements are fed to said rims in the form of a continuous strip and wherein said jaws are provided with a knife for severing said reinforcing elements.

4. Apparatus according to claim 3 wherein said knife is double-edged and is disposed between the heat-sealing jaws and the planes in which the two plies of the web are moved.

5. Apparatus according to claim 2 wherein said heat transfer means comprises an electrical resistance wire embedded in said plate, a control disc mounted in said plate and connected to said wire, a contact pin carried by one end of each of said jaws which, in the operative position of the jaws, resiliently bears on said contact disc, and a current source connected to the other end of each of said jaws.

6. Apparatus according to claim 1 further comprising means to deflect the web into a plane of conveyance which is spaced from the previous plane of conveyance, and guide means adapted to lift at least the edge of one ply adjacent to the gripholes from the other ply, said heat-sealing jaws being provided on both sides of the free edges of said plies.

7. Apparatus according to claim 6 wherein said deflecting means comprises at least one horizontal roller adapted to deflect the web from a first plane of conveyance into a second plane of conveyance, said plane being parallel to and below the first plane of conveyance, and wherein said guide means is disposed adjacent said rollers.

8. Apparatus according to claim 1 wherein said feeding means comprises a sprocket roller for said continuous strip.

9. Apparatus according to claim 1 wherein said means for removing a portion of said web comprises a stationary cutting die having a profile similar to the griphole, and a platen movable toward and away from the cutting die.

10. Apparatus according to claim 9 further comprising means to force air through an air outlet opening in the platen.

11. Apparatus according to claim 1 wherein said feeding means comprises a magazine carrying the reinforcing elements for both plies of the web, and a pusher cooperating with said magazine for feeding two reinforcing elements at the same time from the magazine between the two plies of the web.

References Cited

UNITED STATES PATENTS

| 2,372,008 | 3/1945 | Krueger | 93—35 |
| 2,958,437 | 11/1960 | Mengis | 93—35 |
| 3,302,860 | 2/1967 | Schwarzkopf | 229—54 |

DOUGLAS J. DRUMMOND, Primary Examiner.

U.S. Cl. X.R.

93—1, 8, 35; 156—513, 583